E. R. LE MANQUAIS.
BOLT AND SCREW RETAINER.
APPLICATION FILED NOV. 9, 1911.
1,049,376.
Patented Jan. 7, 1913.
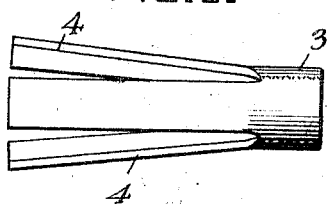
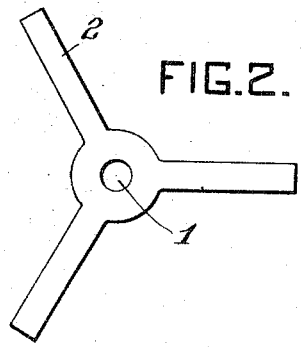
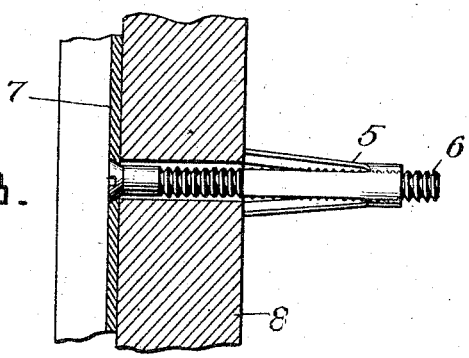

UNITED STATES PATENT OFFICE.

ERNEST R. LE MANQUAIS, OF FAIROAKS, PENNSYLVANIA, ASSIGNOR TO NATIONAL METAL MOLDING COMPANY, OF PITTSBURGH, PENNSYLVANIA, A CORPORATION OF PENNSYLVANIA.

BOLT AND SCREW RETAINER.

1,049,376.　　　　Specification of Letters Patent.　　Patented Jan. 7, 1913.

Application filed November 9, 1911. Serial No. 659,416.

*To all whom it may concern:*

Be it known that I, ERNEST R. LE MANQUAIS, residing at Fairoaks, in the county of Allegheny and State of Pennsylvania, a citizen of the United States, have invented or discovered certain new and useful Improvements in Bolt and Screw Retainers, of which improvement the following is a specification.

The invention described herein relates to the securing of various objects (such, for example, as electrical conduits) to tiled or plastered walls or surfaces; and the object of the invention is to provide a simple, cheap and efficient retaining member for bolts or screws used for securing such objects to such surfaces.

My invention is illustrated in the accompanying drawing, which forms part of the specification, and in which—

Figure 1 is an enlarged view of the retainer; Fig. 2 is the blank from which the retainer may be formed; and Fig. 3 shows an embodiment of my invention.

Like numerals are used to designate like parts.

The retainer, which is particularly shown in Fig. 1, is formed of a single piece of sheet-metal, which before it has been pressed into the form of a retainer may be of the form shown in Fig. 2. The blank is converted into the form of the retainer by a suitable metal-pressing or stamping machine, the retainer so formed consisting of an annular sleeve 3 and integral tines or arms 4, particularly shown in Fig. 1. The hole 1 and the strip-like extensions 2 of the blank, form the end of the sleeve 3 and the tines 4, respectively, of the finished retainer; and the material adjacent to the hole 1 forms the body of the sleeve 3. The blank is so cut, and the retainer is so formed from the blank, that the tines 4 may normally diverge from the sleeve 3, but may, by being pressed together, come within a cylindrical space the diameter of which will not exceed that of the sleeve 3. It will be understood that, when the tines are pressed inwardly, they continuously exert an outward pressure owing to the resiliency of the sheet metal.

In Fig. 3 the retainer is shown as applied to a screw used for holding a conduit-section to a tile or plaster surface. When employed for such purpose, the retainer 5 may be screwed upon the end of the screw 6, and the screw with the retainer may be forced through the holes in the conduit-section 7 and the tile or plaster 8 until the outer ends of the tines 4 shall have passed beyond the inner surface of the tile or plaster 8, which position of the retainer is indicated in Fig. 3. It will be understood that, as soon as the retainer is in such a position the tines 4, which (while the retainer is passing through the tile 8) are held yieldingly against the sides of the screw 6, spring outwardly, and their ends abut against the interior surface of the tile. A turning of the screw 6 may then be effective to securely attach the conduit to the tile or plastered surface.

I do not wish to limit myself to the details of construction of my retainer or to the specific uses illustrated, for obviously many changes as to detail and use may be made by those skilled in the art without departing from the spirit of my invention.

I claim the following:

1. A retainer for bolts or screws, consisting of an internally-threaded sleeve provided with integrally formed outwardly-diverging spring arms projecting from one edge of the sleeve, the outer ends of the said arms being free and adapted to abut against a support.

2. The combination with a bolt or screw, of a retainer consisting of an internally-threaded sleeve mounted on the shank of the bolt or screw, and having integrally formed spring arms divergingly projecting from the edge of the sleeve in the direction of the head of said bolt or screw.

In testimony whereof I have hereunto set my hand.

ERNEST R. LE MANQUAIS.

Witnesses:
PAUL N. CRITCHLOW,
ALICE A. TRILL.